(12) United States Patent
Taylor

(10) Patent No.: US 11,043,889 B2
(45) Date of Patent: Jun. 22, 2021

(54) METHODS AND APPARATUS FOR KINETIC ENERGY HARVESTING

(71) Applicant: Positive Energy, a Gravity and Motion Company, Inc., Newton, MA (US)

(72) Inventor: Helmut K. Taylor, Gilbert, AZ (US)

(73) Assignee: Positive Energy, a Gravity and Motion Company, Inc., Watertown, MA (US)

( * ) Notice: Subject to any disclaimer, the term of this patent is extended or adjusted under 35 U.S.C. 154(b) by 0 days.

(21) Appl. No.: 17/091,713

(22) Filed: Nov. 6, 2020

(65) Prior Publication Data

US 2021/0135557 A1    May 6, 2021

Related U.S. Application Data

(60) Provisional application No. 62/931,301, filed on Nov. 6, 2019.

(51) Int. Cl.
*H02K 35/04* (2006.01)
*H02K 11/04* (2016.01)
(Continued)

(52) U.S. Cl.
CPC ............ *H02K 35/04* (2013.01); *H02K 7/08* (2013.01); *H02K 11/0094* (2013.01); *H02K 11/046* (2013.01)

(58) Field of Classification Search
CPC .................................................... H02K 35/04
See application file for complete search history.

(56) References Cited

U.S. PATENT DOCUMENTS

| 4,500,827 A * | 2/1985 | Merritt ................ H02K 35/04 290/1 R |
| 6,189,576 B1 * | 2/2001 | Markward ............ D03C 11/00 139/54 |

(Continued)

FOREIGN PATENT DOCUMENTS

| JP | 2012/034475 A | 2/2012 |
| KR | 101116372 B1 | 3/2012 |

(Continued)

OTHER PUBLICATIONS

Schreiber et al. "A multimodal dataset of human gait at different walking speeds established on injury-free adult participants," Sci Data 6, 111 (2019).

(Continued)

*Primary Examiner* — Dang D Le
(74) *Attorney, Agent, or Firm* — Foley Hoag LLP; Rajesh Vallabh

(57) ABSTRACT

Kinetic energy harvesting methods and devices are disclosed. A portable kinetic energy harvesting device includes a housing with a plurality of magnets fixed at spaced-apart locations in the housing. A wire coil is movably positioned in the housing for reciprocating movement past the magnets. The reciprocating movement of the wire coil through magnetic fields of the magnets generates an alternating current in the wire coil. A circuit electrically connected to the wire coil includes a rectifier to convert the alternating current generated by the wire coil into direct current. The device can be used to charge batteries including, e.g., batteries for powering portable electronic devices.

25 Claims, 13 Drawing Sheets

(51) Int. Cl.
*H02K 11/00* (2016.01)
*H02K 7/08* (2006.01)

(56) References Cited

U.S. PATENT DOCUMENTS

| | | | | |
|---|---|---|---|---|
| 6,220,719 | B1 | 4/2001 | Vetorino et al. | |
| 7,218,018 | B2* | 5/2007 | Hasegawa | H02K 33/16 310/112 |
| 7,288,860 | B2* | 10/2007 | Cheung | H02K 35/02 290/1 R |
| 8,729,747 | B2* | 5/2014 | Arnold | H02K 35/02 310/34 |
| 9,325,232 | B1* | 4/2016 | Hunstable | H02K 7/075 |
| 2005/0218728 | A1* | 10/2005 | Stewart | H02P 9/00 310/12.12 |
| 2008/0217926 | A1 | 9/2008 | Lemieux | |
| 2008/0246346 | A1* | 10/2008 | Harris | H02K 35/02 310/12.12 |
| 2015/0214823 | A1 | 7/2015 | Shastry et al. | |

FOREIGN PATENT DOCUMENTS

| | | |
|---|---|---|
| KR | 101861255 B1 | 5/2018 |
| WO | WO-2005093931 A1 | 10/2005 |
| WO | WO-2011/132212 A2 | 10/2011 |

OTHER PUBLICATIONS

Cai et al., "Enhanced electromagnetic wrist-worn energy harvester using repulsive magnetic spring," Mechanical Systems and Signal Processing, 150: 107251 (2021).

Cai et al., "Recent Advances in Human Motion Excited Energy Harvesting Systems for Wearables," Energy Technology, 8(10): 2000533 (17 pages)(2020).

Digregorio et al., "Modeling and Experimental Characterization of an Electromagnetic Energy Harvester for Wearable and Biomedical Applications," IEEE Access, 8: 175436-175447 (2020).

Hamid et al., "A wearable energy harvester unit using piezoelectric-electromagnetic hybrid technique," Sensors and Actuators A: Physical, 257: 198-207 (2017).

Khaligh et al., "Kinetic Energy Harvesting Using Piezoelectric and Electromagnetic Technologies—State of the Art," IEEE Transactions of Industrial Electronics, 57(3): 850-860 (2010).

Kulah et al., "Energy Scavenging From Low-Frequency Vibrations by Using Frequency Up-Conversion for Wireless Sensor Applications," IEEE Sensors Journal, 8(3): 261-268 (2008).

Li et al., "Wearable energy harvesters generating electricity from low-frequency human limb movement," Microsystems and Nanoengineering, 4(24): 13 pages (2018).

Lin et al., "A rotational wearable energy harvester for human motion," Proceedings of the 17th IEEE International Conference on Nanotechnology: 22-25 (2017).

Rome et al., "Generating Electricity While Walking with Loads," Science, 309: 20 pages (2005).

Saha et al., "Electromagnetic generator for harvesting energy from human motion," Sensors and Actuators A: Physical, 147: 248-253 (2008).

Salauddin et al., "Design and experiment of human hand motion driven electromagnetic energy harvester using dual Halbach magnet array," Smart Materials and Structures, 26: 035011 (13 pages)(2017).

Wang et al., "Magnetic-spring based energy harvesting from human motions: Design, modeling and experiments," Energy Conversion and Management, 132: 189-197 (2017).

Zhang et al., "Design of high-efficiency electromagnetic energy harvester based on a rolling magnet," Energy and Conversion and Management, 185: 202-210 (2019).

International Search Report and Written Opinion for International Application No. PT/US2020/059439 dated Mar. 3, 2021.

* cited by examiner

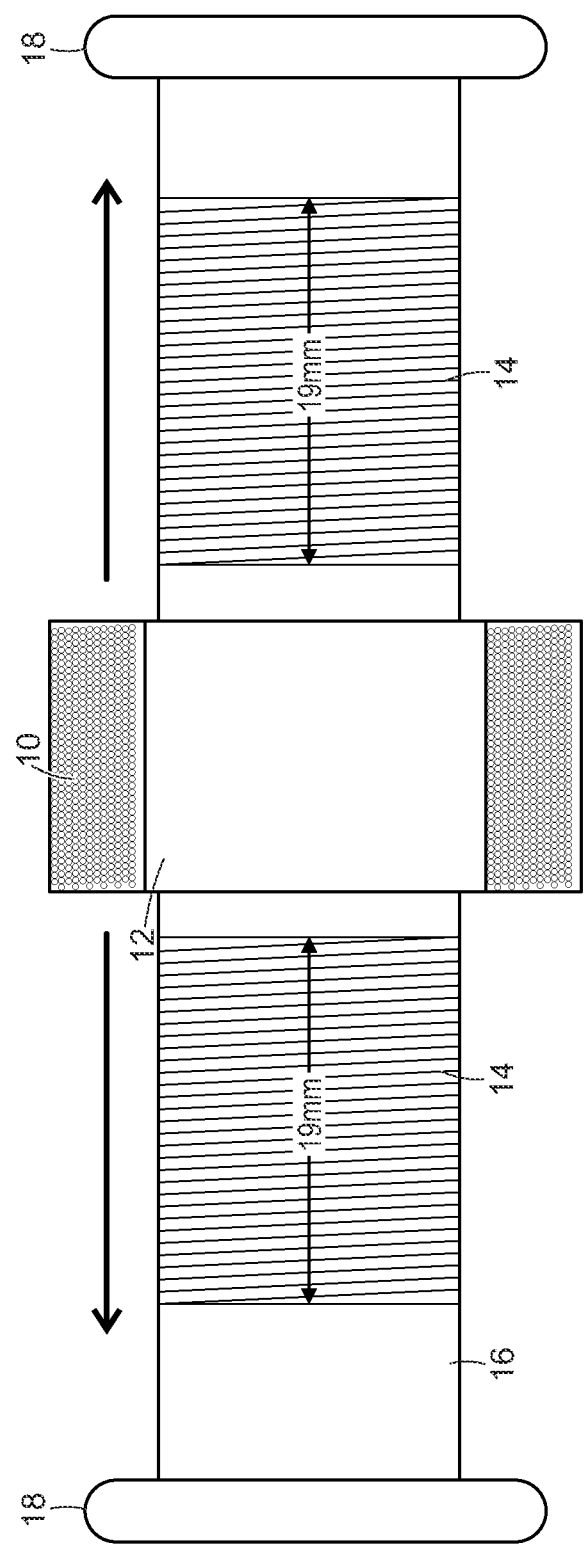

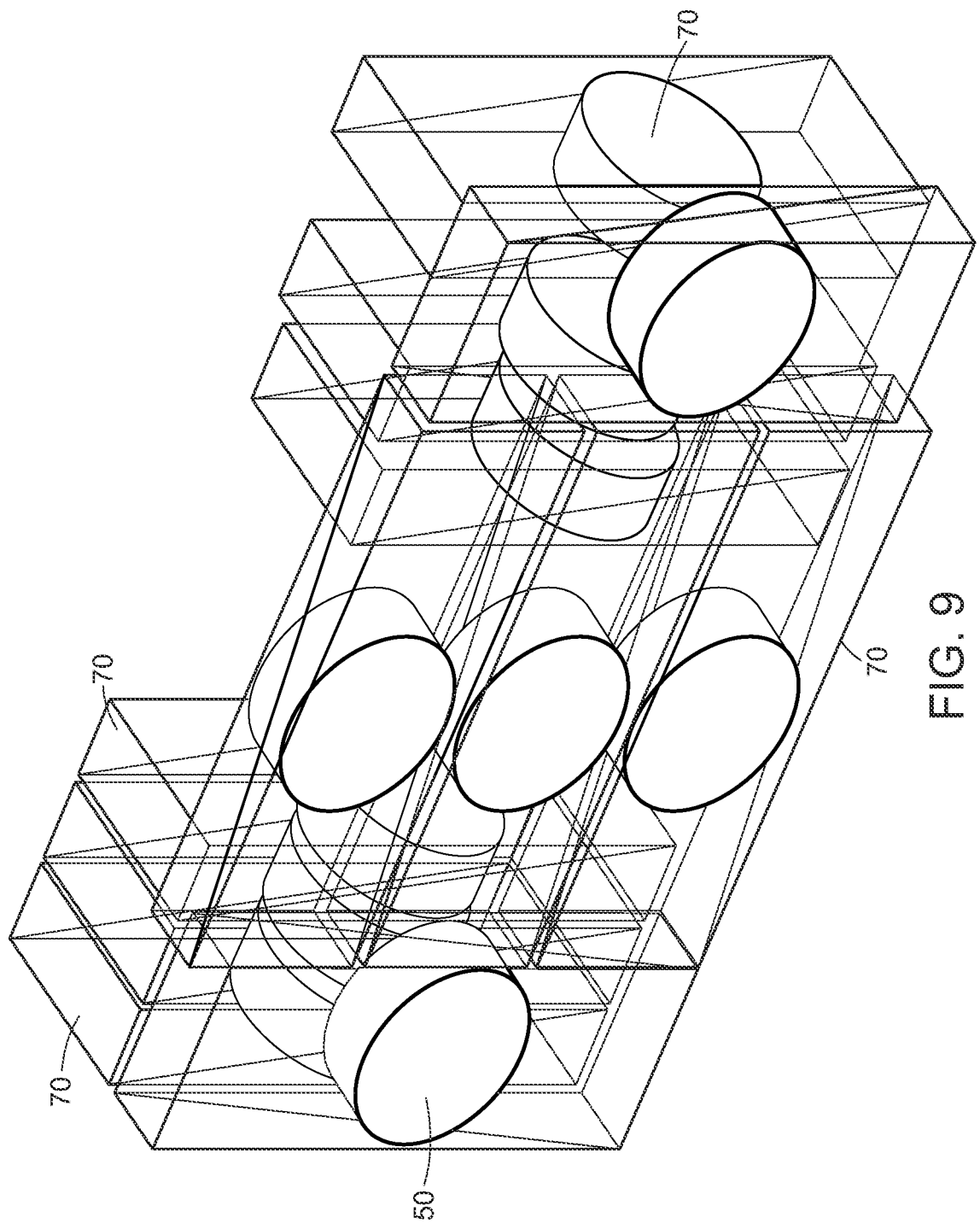

US 11,043,889 B2

METHODS AND APPARATUS FOR KINETIC ENERGY HARVESTING

CROSS REFERENCE TO RELATED APPLICATION

This application claims priority from U.S. Provisional Patent Application No. 62/931,301 filed on Nov. 6, 2019 entitled METHODS AND APPARATUS FOR KINETIC ENERGY HARVESTING, which is hereby incorporated by reference.

BACKGROUND

The present application relates generally to kinetic energy harvesting devices including, but not limited to, portable devices that generate electricity from human movement as well as from gravitational movement for use in powering personal electronic devices.

BRIEF SUMMARY OF THE DISCLOSURE

An apparatus for converting kinetic energy to electrical energy is disclosed in accordance with one or more embodiments. The apparatus includes a housing. A plurality of magnets are fixed at spaced-apart locations in the housing defining a path. A wire coil is movably positioned in the housing for back and forth movement along the path such that the movement of the wire coil through magnetic fields of the plurality of magnets generates an alternating current in the wire coil. A circuit is electrically connected to the wire coil. The circuit includes a rectifier to convert the alternating current generated in the wire coil into direct current.

A method for converting kinetic energy to electrical energy in accordance with one or more embodiments comprises the steps of: moving a wire coil back and forth along a path defined by a plurality of magnets fixed at spaced-apart locations in a housing such that the movement of the wire coil through magnetic fields of the plurality of magnets generates an alternating current in the wire coil; and converting the alternating current generated in the wire coil into direct current.

BRIEF DESCRIPTION OF THE DRAWINGS

FIGS. 1A and 1B illustrate an exemplary kinetic energy harvesting device with a moving cylindrical coil mounted on a cylindrical magnet array in accordance with one or more embodiments.

FIG. 9 illustrates an exemplary kinetic energy harvesting device having multiple chambers each with one moving coil.

DETAILED DESCRIPTION

Various embodiments disclosed herein relate to kinetic energy harvesting methods and devices. A kinetic energy harvesting device includes a housing with a plurality of magnets fixed at spaced-apart locations in the housing. A wire coil is movably positioned in the housing for reciprocating (i.e., back and forth) movement past the magnets. The reciprocating movement of the wire coil through magnetic fields of the magnets generates an alternating current in the wire coil. A circuit electrically connected to the wire coil includes a rectifier to convert the alternating current generated by the wire coil into direct current. The device can be used for various purposes, including to charge a battery for powering a portable electronic device like Android and iPhones smartphones.

The following are non-limiting examples of kinetic energy harvesting devices in accordance with various embodiments.

Moving Cylindrical Coil on a Cylindrical Magnet Array

Figure 1B:
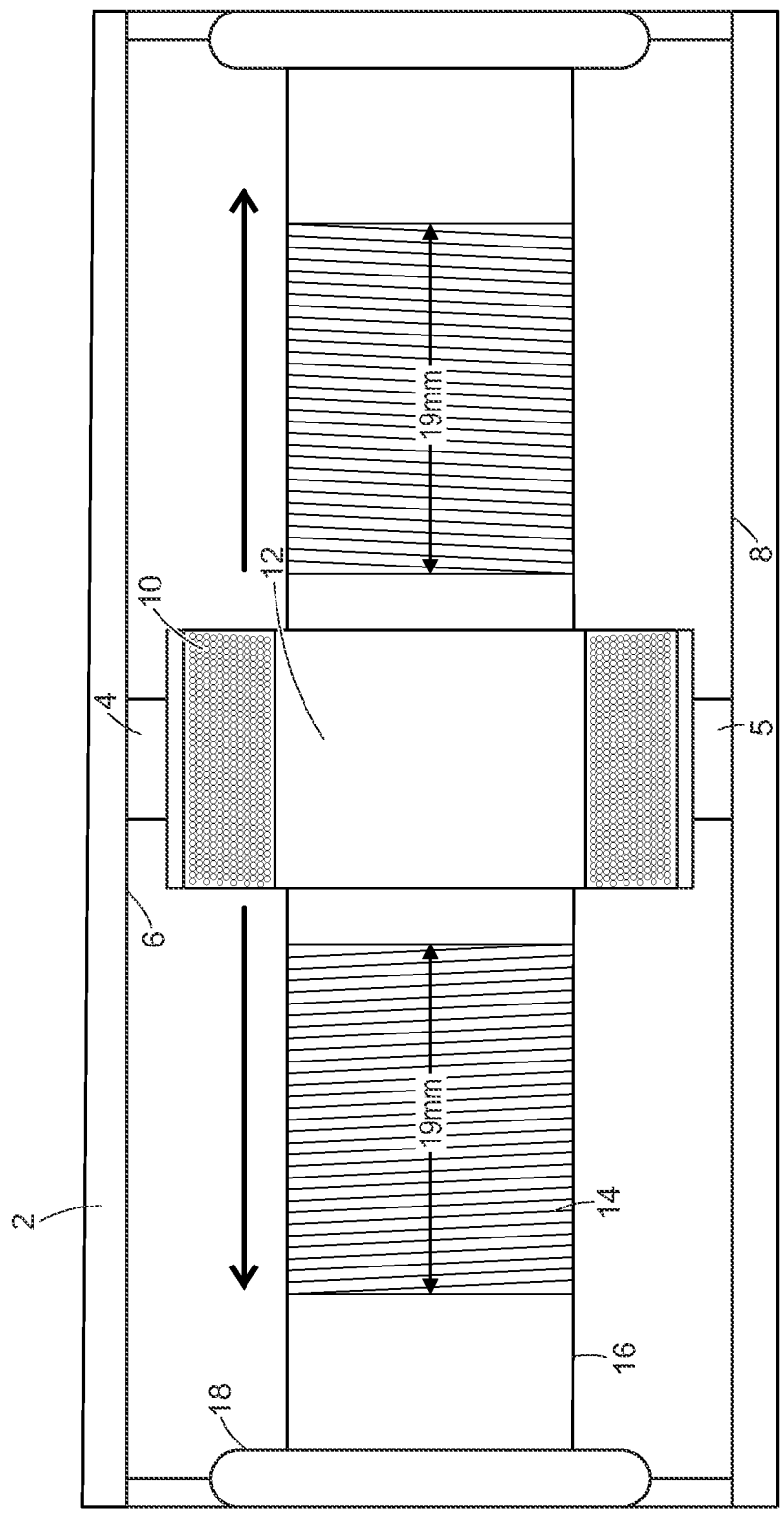

FIGS. 1A and 1B illustrate an exemplary kinetic energy harvesting device with a moving cylindrical coil on a cylindrical magnet array in accordance with one or more embodiments. FIGS. 1A and 1B show the device without and with the outer housing, respectively.

In this embodiment, a wire coil 10 is wound around a tubular element 12 that is arranged concentrically around a cylindrical shaft 16. The figures show a partial cross-section view of the wire coil 10 around the tubular element 12 for purposes of illustration.

One or more cylindrical magnets 14 are spaced-apart over the length of the shaft 16.

The wire coil 10 harvests electric energy from kinetic energy as it moves along the shaft 16 across the cylindrical magnets 14. A burst of electric current is generated as the coil 10 moves across each magnet 14. The motion of the coil 10 induces negative and positive pulses into the coil. The coil 10 is electrically connected to one or more circuits (discussed in further detail below) that regulate, rectify, and provide the balanced voltage feed to charge uninterrupted battery backup and or a charging port such as a USB charging port, as will be discussed below.

As shown in FIG. 1B, an outer housing 2 contains the energy harvesting device. The inner wall of the housing 2 is lined with separate conductive surfaces at opposite sides 6 and 8. One end of the wire coil 10 is electrically connected by conductive element 4 to the conductive surface 6. The other end of the wire coil 10 is electrically connected by conductive element 5 to the conductive surface 8. The conductive surfaces 6, 8 are electrically connected to the one or more circuits mentioned above. The conductive elements 4, 5 glide along the conductive surfaces 6, 8, respectively. The conductive surfaces 6, 8 can comprise, e.g., a layer of copper or brass (e.g., 0.4 mm thick) that is polished to reduce friction losses as the coil moves back and forth in the housing.

Although two magnets 14 are shown in the figure, generally any number can be used.

Two spring elements 18 that can be impacted by the wire coil 10 are provided at opposite ends of the shaft 16. The spring elements 18 provide a spring-like repelling effect on the wire coil 10 as it reaches each end of the shaft 16. This mitigates inertia losses as the wire coil changes its direction of travel on the shaft. In one example, the spring elements increase the energy available for harvest by a factor of 0.02 N.

In this example, the spring elements comprise O-Rings. Other types of spring elements are also possible, including various type of flat and coiled springs, membranes etc.

The spring elements can be incorporated in any of the embodiments disclosed herein for mitigating inertia losses.

Figure 2:
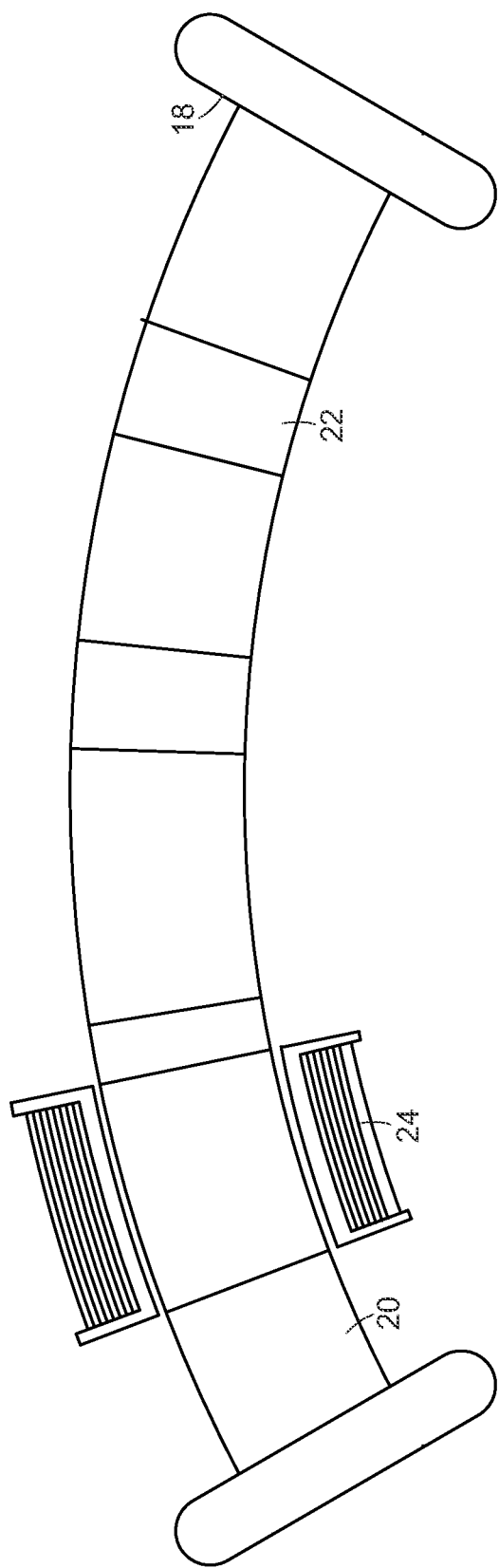
FIG. 2 illustrates another exemplary kinetic energy harvesting device with a moving cylindrical coil on a curvilinear cylindrical magnet array in accordance with one or more further embodiments.

FIG. 2 illustrates an alternative embodiment similar to the FIGS. 1A and 1B embodiment. This embodiment includes a shaft 20 having magnets 22 that has a curvilinear shape or gentle U-shape instead of the straight shape depicted in FIGS. 1A and 1B. The wire coil 24 also has a curvilinear shape matching the radius and bend of the shaft 20. This design enhances the sensitivity of the moving coil to motion of the device.

In one example, the wire coil 24 comprises a cylindrical coil 16 mm in diameter and 25 mm long. In one example, the magnets are natural earth magnets having 3000 mGauss or better field-strength. In one example, the shaft on which the magnets are mounted is an acrylic shaft.

Figure 3:
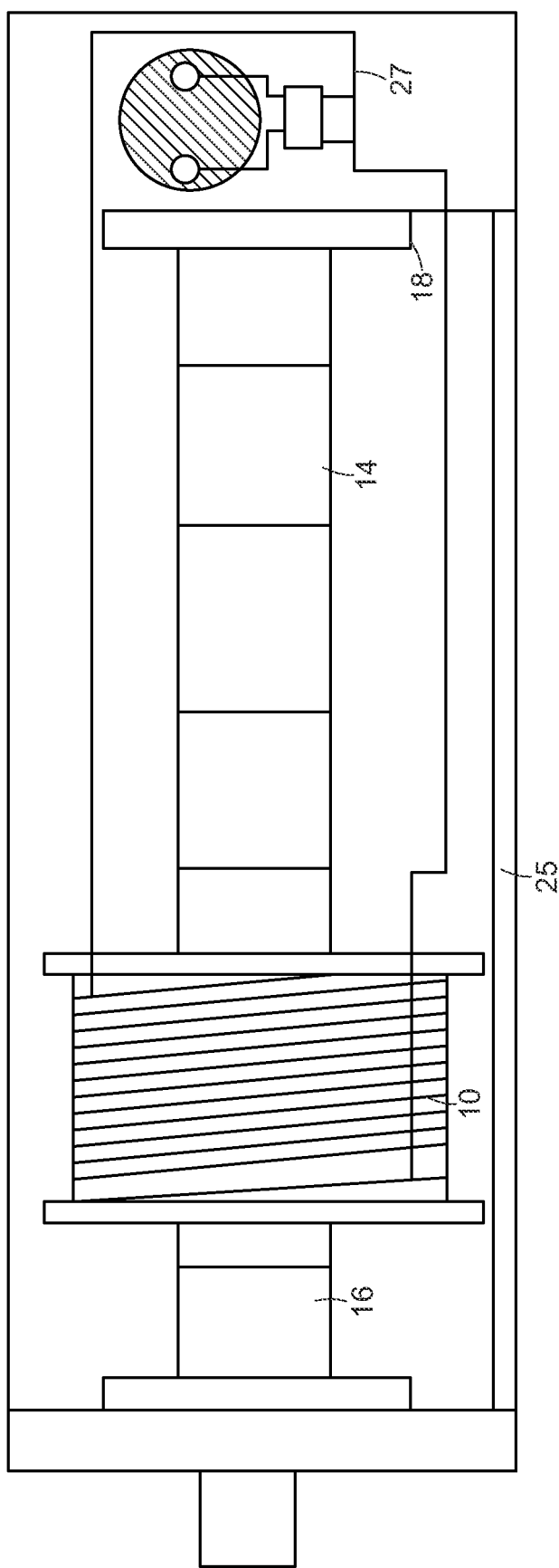
FIG. 3 illustrates an exemplary kinetic energy harvesting device in an enclosure sized and shaped like a battery in accordance with one or more further embodiments.

FIG. 3 illustrates one example of a type of housing 25 for a device with a moving cylindrical coil 10 on a cylindrical magnet array in accordance with one or more further embodiments. The housing 25 is sized and shaped like a battery. The housing 25 includes a circuit 27 (similar to circuits discussed below) electrically connected to the wire coil 10, which includes a rectifier to convert the alternating current generated by the wire coil into direct current and an internal battery to store electrical energy generated by the device.

Various battery sizes can be used including, but not limited to, a D-size battery or a B-size battery. In one exemplary application, the energy harvesting device can be installed in a standard flashlight using batteries. The device stores kinetic energy to power an LED in the flashlight. It is estimated that 1 minute of kinetic motion can provide 10 minutes to an hour of light output depending on LED brightness.

Flat-Magnet-Pair Rotary Motion Generator

Figure 4A:
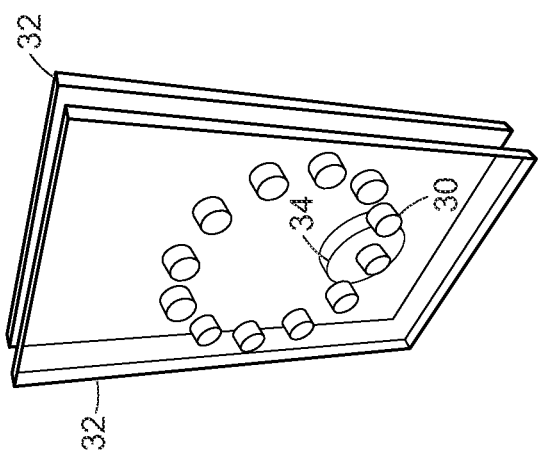
FIGS. 4A and 4B illustrate an exemplary rotary motion energy harvesting device in accordance with one or more further embodiments.
Figure 4B:
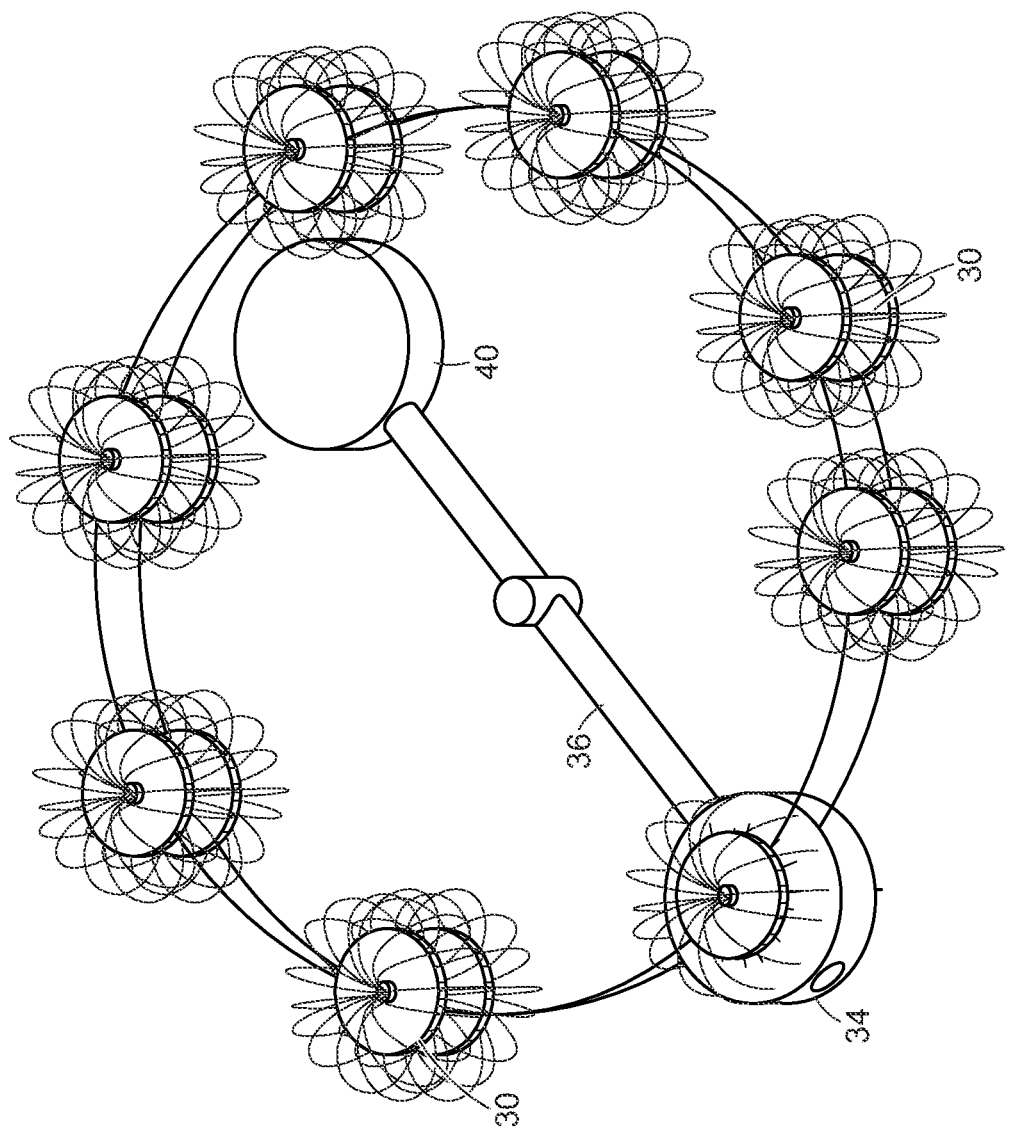

FIGS. 4A and 4B illustrate an exemplary flat-magnet-pair rotary motion generator energy harvesting device in accordance with one or more further embodiments. FIG. 4A illustrates the arrangement of magnets 30 on the panels 32 of a housing. The shaft and anchor mechanism is not shown in this figure for ease of illustration, but is depicted in FIG. 4B.

In this embodiment, flat magnets 30 are arranged in North-South pairs in a circular array. The magnets 30 are on two adjacent panels 32 (shown in FIG. 4A). An open gap between the two panels 32 provides space for a movable flat coil element 34 to move freely in the gap through the magnetic fields formed between the magnet pairs 32. As shown in FIG. 4B, the coil element 34 is attached to one end of a shaft 36. The shaft 36 is anchored in the center of the circular array of magnets. The moving coil element 34 at the end of the shaft 36 moves freely like the pendulum of a clock. The weight of the coil element 34 at one end of the shaft 36 is counterweighted at 40 at the opposite end of the shaft by element 36. This configuration features scalability. The magnet pairs 30 and flat coil 34 allow scaling overall thickness of this motion generator. The coil is flat, and to increase conductivity, its diameter can be increased. In addition, the field strength of the flat magnets 30 can be increased by choosing lager diameter magnets. The flat area of the motion generator increases for greater harvesting efficiency, but the overall thickness can be unchanged. This configuration provides improved sensitivity to motion.

This pendulum-like arrangement is very sensitive to the earth's center of gravity as the coil swings passing though the gaps between the magnet pairs 30. The inductance of the coil 34 and the field strength of the magnets 30 is constant. The harvested current burst energy is proportional to coil inductance, magnetic field strength, the velocity of the coil swings, and the number of magnet pairs the coil swing will pass on a swing.

As with other embodiments, the coil 34 is electrically connected to one or more circuits (described below) that regulate, rectify, and provide the balanced voltage feed to charge uninterrupted battery backup and or a charging port such as a USB charging port, as will be discussed below. The coil can be connected to the circuits through electrical wiring extending through the shaft 36.

Pocket Version Motion Generator Embodiment

Figure 5:
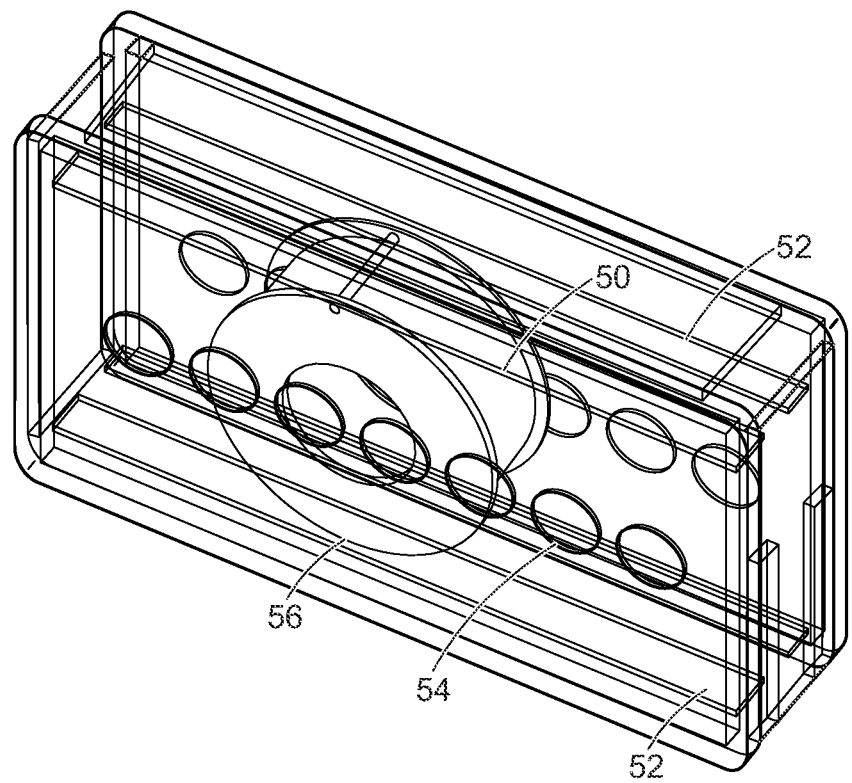
FIGS. 5 and 6 illustrate additional exemplary kinetic energy harvesting devices in accordance with one or more embodiments.
Figure 6:
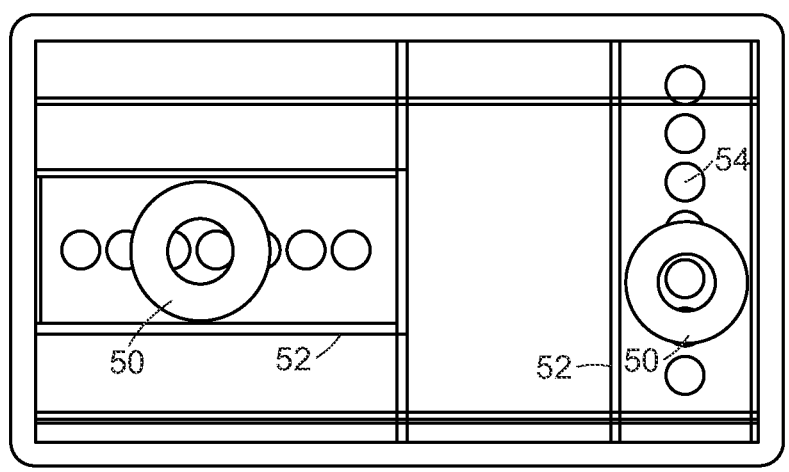

FIGS. 5 and 6 illustrate additional exemplary kinetic energy harvesting devices in accordance with one or more embodiments. These devices comprise a small (e.g., pocket-sized) motion generator mechanism. In the devices, forces are captured due to linear motion of one or more free moving coils 50.

The FIGS. 5 and 6 devices each include a flat box shaped enclosure having a set of guard rails 52. Each coil 50 moves in the enclosure guided by the guard rails 52 past a row of magnets 54. The coil 50 in the FIG. 5 enclosure can only move right or left. The FIG. 6 embodiment has two coils 50: one coil 50 moves left or right, while the other coil 50 moves transversely up or down.

The guard rails 52 and coil slider bracket 56 (on which the coil 50 is wound) have a loose fit arrangement between the touching surfaces. The coil 50 will react to an imbalance of the enclosure horizontal relative to the gravitational force. The coil 50 will gravitate to one direction depending on the tilt or the resulting incline of the guardrails 52 and slide freely in either direction.

The four point fixation of the coil slider bracket 56 within the four guiding rails 52 in addition allows for free sliding in any tilting (forward or backward) of the enclosure's horizontal orientation.

Conductive collectors are arranged on both side disks of the bracket 56 connected to the coil ends. These are electrically connected to conductive flat surfaces on the edge of all four guide rails 52. This provides a continuous electrical connection of the electromagnetic generated power source to connected circuits. The circuits regulate, rectify, and provide the balanced voltage feed to charge uninterrupted battery backup and or a charging port such as a USB charging port, as will be discussed below.

The magnets 54 in this and other embodiments can comprise a set of small flat rare-earth magnets are embedded in the enclosure walls. A gravitational imbalance of the enclosure will cause linear movement of the coil 50, which will break the magnetic field. The coil 50 and the magnets 54 do not touch, but are positioned closely to reduce air losses by making air gaps as small as possible.

Figure 7:
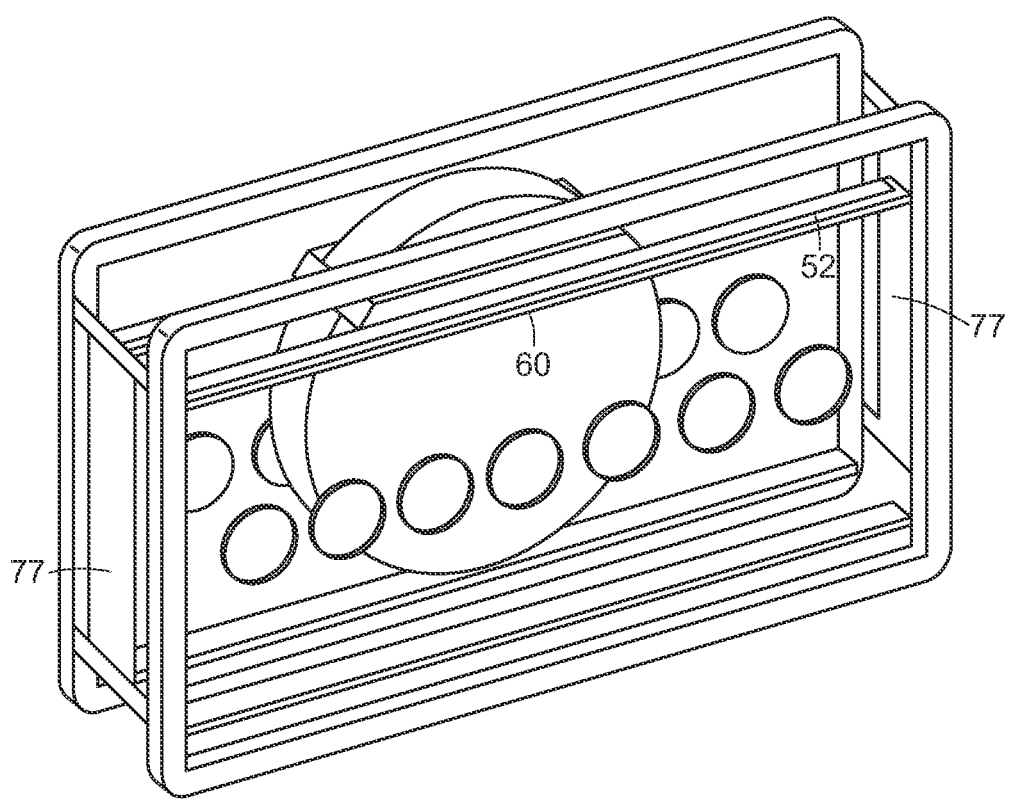
FIG. 7 illustrates an exemplary guardrail of a kinetic energy harvesting device with a groove holding ball bearings to reduce friction in accordance with one or more embodiments.

In one or more embodiments, small diamagnetic ball bearings 60 (as shown in FIG. 7) are installed on guard rails 52 to reduce friction as the coil bracket 56 glides on the rails 52. The guardrails 52 can have small grooves to hold a number of diamagnetic spheres 60 fitted in sufficient numbers to provide optimized friction free sliding off the coil assembly 56. It is desired to capture as much imbalanced gravity movement as possible to convert it into magnetic induced power in the coil. Mechanical friction losses are thereby preferably minimized. Such guard rails with ball bearings can be implemented in any of the embodiments disclosed herein. In one or more embodiments, the housing is equipped with membranes 77 at opposite ends of the rails 52. The membranes function as spring elements to reduce inertial losses as the coil reaches the end of the housing and changes direction. In one exemplary embodiment, the membranes 77 can comprise brass foils having a 0.35 mm thickness.

In operation, any imbalance of the devices will cause the coil 50 to move inside its chamber. As the coil 50 moves through the magnetic fields of the magnets 54, an alternating electric current is generated in the coil 50. As with other embodiments, a circuit is connected to the coil 50. The current generated in the coil 50 is converted by a bridge in the circuit to direct current, and processed as will be discussed below.

Figure 8:
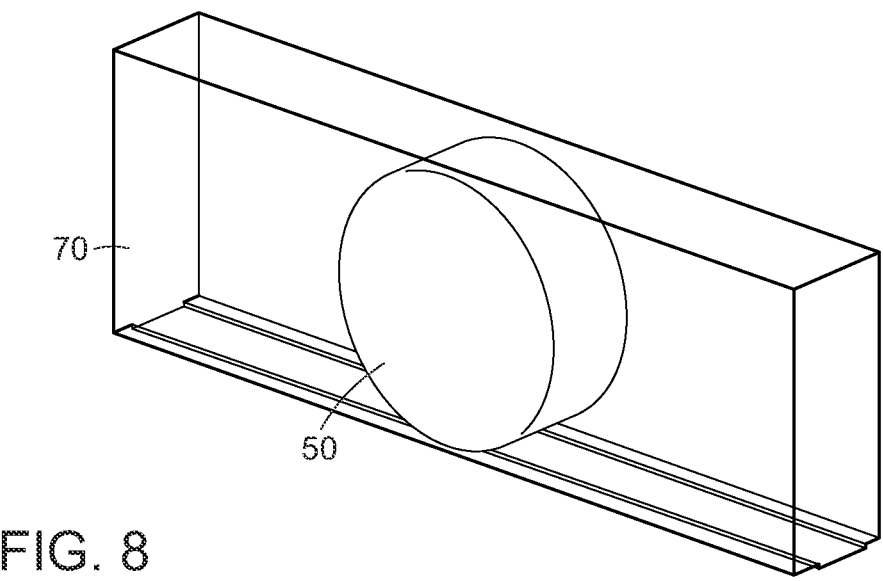
FIG. 8 illustrates an exemplary kinetic energy harvesting device in which the coil is mounted in an airtight and vacuum chamber in accordance with one or more embodiments.

FIG. 8 illustrates an exemplary energy harvesting device in which friction is reduced by containing the coil 50 in an airtight and vacuum chamber 70. The coil 50 will move in a vacuum to avoid any air friction or air pockets at either end of the chamber. This additional optimization could optionally also feature the friction reducing guard-rails (with or without ball bearings) as described above. The objective of a vacuum chamber 70 is to avoid air pockets, which reduce the velocity of the coil and as the result reduce the efficiency of flux. The velocity of the coil movement is directly proportional to the function between magnetic arrays and amount of electrical field flux. Adding the ball bearing guard rails further reduces mechanical friction. Use of such an airtight vacuum chamber can be implemented in any of the embodiments disclosed herein.

The energy harvesting devices can be implemented in various types of additional enclosures, e.g., an enclosure sized and shaped like a battery as previously discussed.

Scalable Implementation of Multi-Dimensional Vacuum Coil Chamber

FIG. 9 illustrates an exemplary kinetic energy harvesting device in accordance with one or more embodiments having multiple kinetic energy harvesting chambers 70, each with one moving coil 50 therein. The chambers 70 are arranged in transverse directions to enhance capturing kinetic movement in any direction. The chambers 70 can each comprise a vacuum chamber, as discussed above.

Gravity Pendulum Motion Generator Embodiment

Figure 10B:
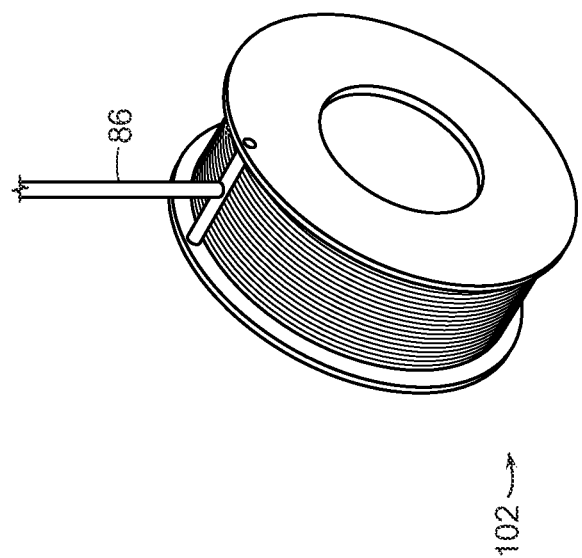
FIG. 10B is an enlarged view of the inductive air coil of the pendulum kinetic energy harvesting device of FIG. 10A.
Figure 10A:
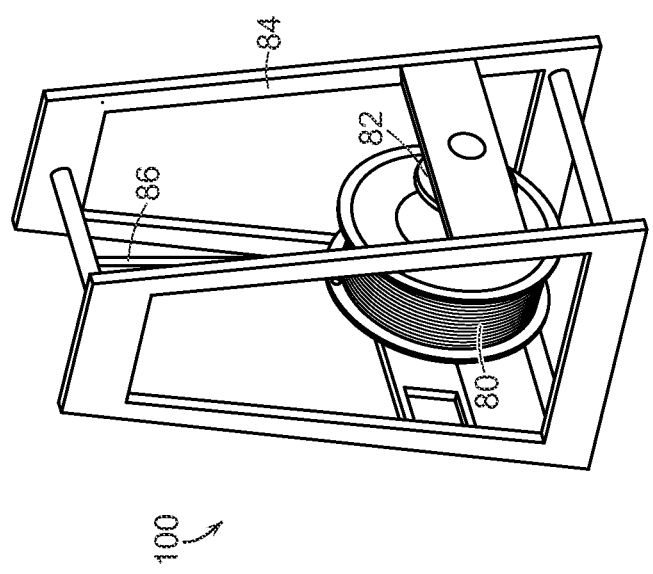
FIG. 10A illustrates an exemplary pendulum kinetic energy harvesting device in accordance with one or more embodiments.

FIGS. 10A and 10B depict an exemplary gravity pendulum kinetic energy harvesting device in accordance with one or more embodiments. The device converts the swing motion of the pendulum kinetic energy into electrical energy. The device uses the inductive properties of an inductive air coil 80, which can be measured, e.g., in millihenry, to generate electric periodical pulses. The electrical pulses are inducted by the coil's periodic movements through a static magnetic field. The source of the static magnetic field is a set of rare magnetic disks 82 arranged at the opposite ends of the swing pass of the inductive coil 80.

The device uses gravitational forces and swing motion to generate electricity from the motion of the inductive coil 80 in a magnetic field. The device combines well known physical properties of electromagnetism and mechanical properties of a gravity pendulum. Integrating the physical properties of these basic and fundamentally known technical principles in this way provides a unique apparatus to generate renewable electrical energy.

The coil 80 releases periodic electrical pulses at the frequency of the periodic swings of the pendulum moving the coil 80 between the permanent magnets 82. The captured electrical energy is proportional to the frequency of the pendulum swings and the electromagnetic induction captured by the coil's inductive properties. In some particular examples, the device generates approximately one to two watts of power.

By way of example, the magnets 82 in this and other embodiments disclosed herein can be natural earth magnets having 3000 mGauss or better field-strength.

The positive and negative pulse trains produce an alternating current that is fed to a connected solid-state rectifier electric circuit discussed below. The electrical circuit filters and converts the alternating current pulses into direct current, in some exemplary applications at a voltage of more than 10 to 12 volts.

The electromagnetic coil 80 is suspended in a frame structure 84. In one example, the coil 80 has a diameter of about 25.4 mm and a depth of about 21 mm. The coil wire has a thickness of about 0.45 mm. The coil 80 is mounted at the end of a pendulum arm 86, which has a length of about 60 mm.

The coil 80 is mounted at the low gravity point of a pendulum. The coil swing movements are limited by the magnet mounts located spaced by 8 degrees on each side of the swing space. The pendulum swings from movement of the portable frame. In some applications, the frame can be fixed to a person or animal, e.g., on an arm or leg. Movement of the arm or leg generates a periodic waveform, e.g., at 15 volts.

In some applications, the pendulum coil 80 is mounted in a stationary frame. The periodic swings can be powered by a gravity pull similar to mechanisms found in a wall mounted clock. The force of this mechanism can be adjusted to provide a constant run time of hours sufficient to charge several small USB connected devices. In some examples, the mechanism can generate 2 watts of charge energy at a 10 to 15 volts amplitude of alternating wave forms.

Reverse Escapement Kinetic Power Source Embodiment

Figure 11:
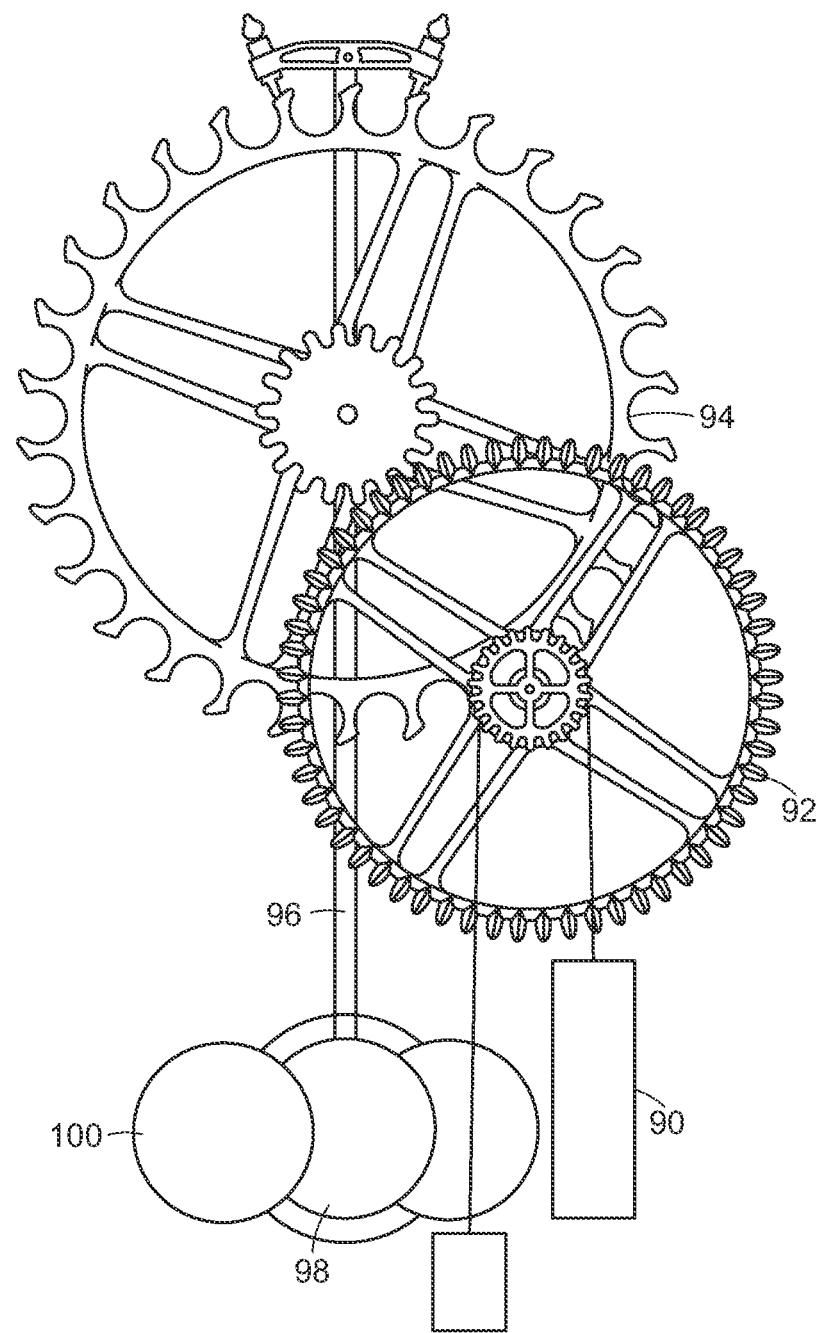
FIG. 11 illustrates an exemplary stationary device for kinetic energy harvesting in accordance with one or more embodiments, where the kinetic power source is a reverse escapement mechanism.

FIG. 11 illustrates an exemplary stationary device for kinetic energy harvesting in accordance with one or more embodiments, where the kinetic power source is a reverse escapement mechanism. A weight 90 pulls a gear 92 fixed to an escapement wheel 94 depending in a vertical path over a period of time, e.g., one hour, creates a constant kinetic force to keep a pendulum 96 in motion. The coil 98 at the end of the pendulum generates electric energy while swinging through stationary magnetic fields of fixed permanent magnets 100.

The escapement receives its kinetic energy from the vertical descending weight 90. The timing of the pendulum swings are dependent of the length of the pendulum, its weight (the coil at the end of the pendulum shaft), and the swing controlled by the escapement wheel gaps. In one example, the design yield two swings per second, generating four full cycles of over 5 volt spikes each swing cycle. This device generates electric energy as long as the vertical weight 90 is descending on its fixed vertical path.

Circuit for Processing Current from Kinetic Energy Harvesting Devices

Figure 12:
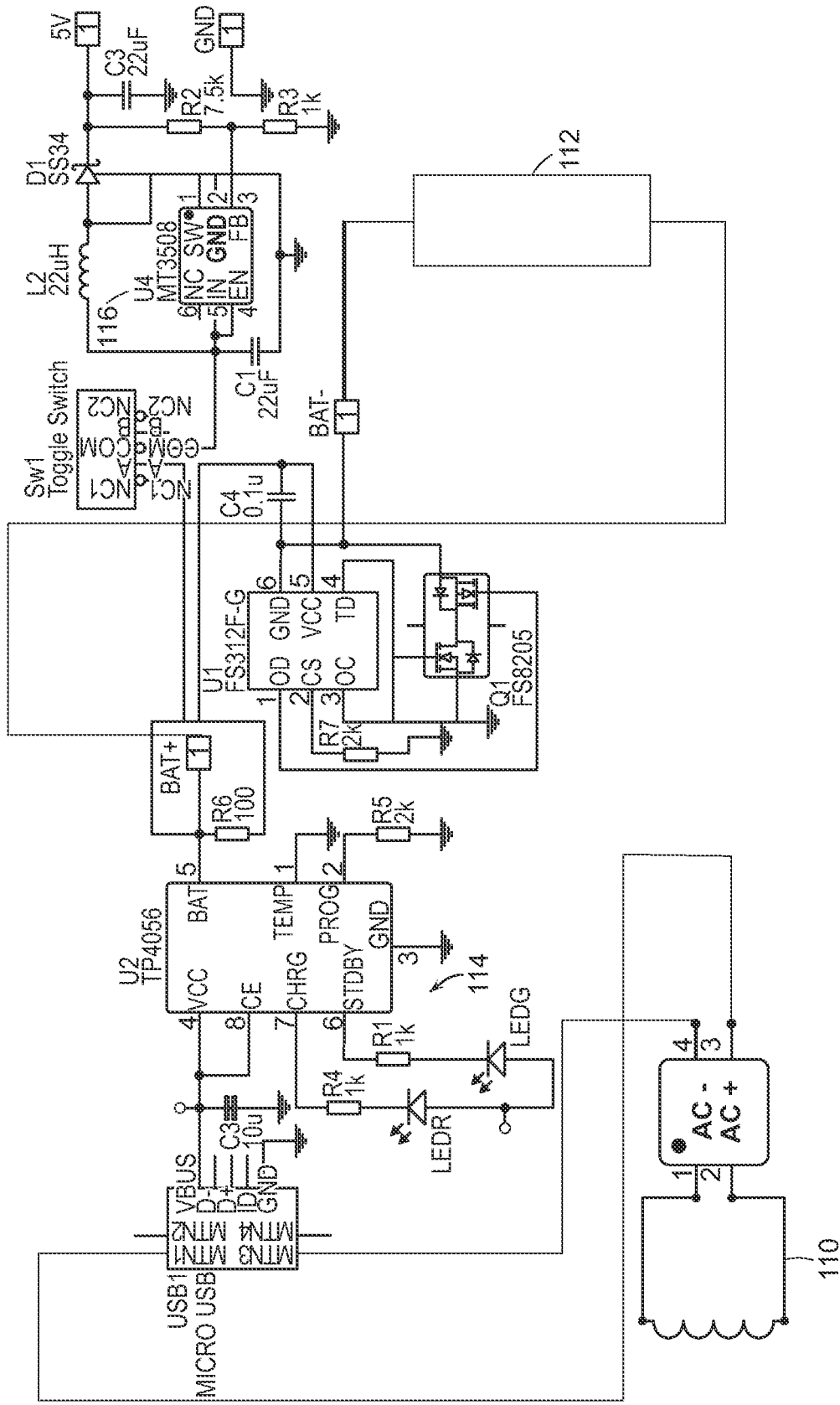
FIG. 12 illustrates an exemplary circuit including a rectifier and battery that can be connected to an energy harvesting device in accordance with one or more embodiments.

The motion of the coil elements in the harvesting devices discussed above induces negative and positive pulses into the coil. The coil ends are electrically connected to the circuit 110 shown in FIG. 12, which includes a simple diode bridge. The bridge converts the alternating current generated by the motion device to DC voltage approximately at 10 to 13 volts. A battery (e.g., a lithium battery) 112 or capacitor is connected to the bridge via a protection circuit 114. The protection circuit 114 regulates the voltage variation supplied from the AC to DC rectifier bridge 110. An LED indicator in the circuit can show the charge status of the battery 112. The circuit can switch, e.g., 4.5 volts to the USB interface 116, which can be connected to a portable electronic device like an iPhone to charge the device or sustain operation of the device.

The protection circuit 114 comprises a charger board (e.g., a TP4056 charger board) input terminal connected to the rectifier bridge for sensing any voltage level above 2V. It trickle charges the battery 112 connected the B+ and B− port of the circuit. This circuit 114 prevents overcharging. The circuit 114 automatically monitors charge current and voltage. An indicator LED indicates charging and completed charging If the voltage level has reached 4.5 volts at the b terminal of the board.

The USB device 116 on the power supply converter board provides a regulated charge voltage of exactly 5V suitable to charge iPhone or android or other portable electronic devices. Voltage present at the +− port of the TP 4056 or B terminal between 2 volts or 26 volts is switched to the output +/¬ port at 4.5 volts regulated. Consequently the USB device gets power either from the battery 112 or the directly from the rectifier power source. Ideally, charging is performed when the battery 112 and the circuit LED indicates a fully charged state.

The voltage from the bridge 110 is monitored and switched by the overcurrent protection circuit 114, and switched to the battery 112. The circuit 114 determines the charge of the battery 112. If battery 112 is less than fully charged, the circuit 114 applies the voltage from the circuit 110 to the terminals of circuit 116 connected to the battery 112. A red light in circuit 114 indicates that charging of battery 112 is in progress. The charging-in-progress indicator in circuit 114 will turn green as soon as the battery 112 is fully charged. The overcurrent protection circuit 114 monitors the voltage level of the battery 112. To prevent overcurrent conditions, the circuit 114 will switch off the path from the circuit 114 battery terminal to the circuit 114 Volt out. This will protect the battery 112 and step up function in circuit from overcurrent conditions.

The circuit 110 can be a simple rectifier bridge 7G DB107. This bridge is connected to each coil. The circuit 114 logic determines if the voltage levels have reached a level of 4.5 volts, but not greater than 5 volts. The circuit of 114 steps down any voltage level exceeding 5 volts.

Power Management System

Figure 13:
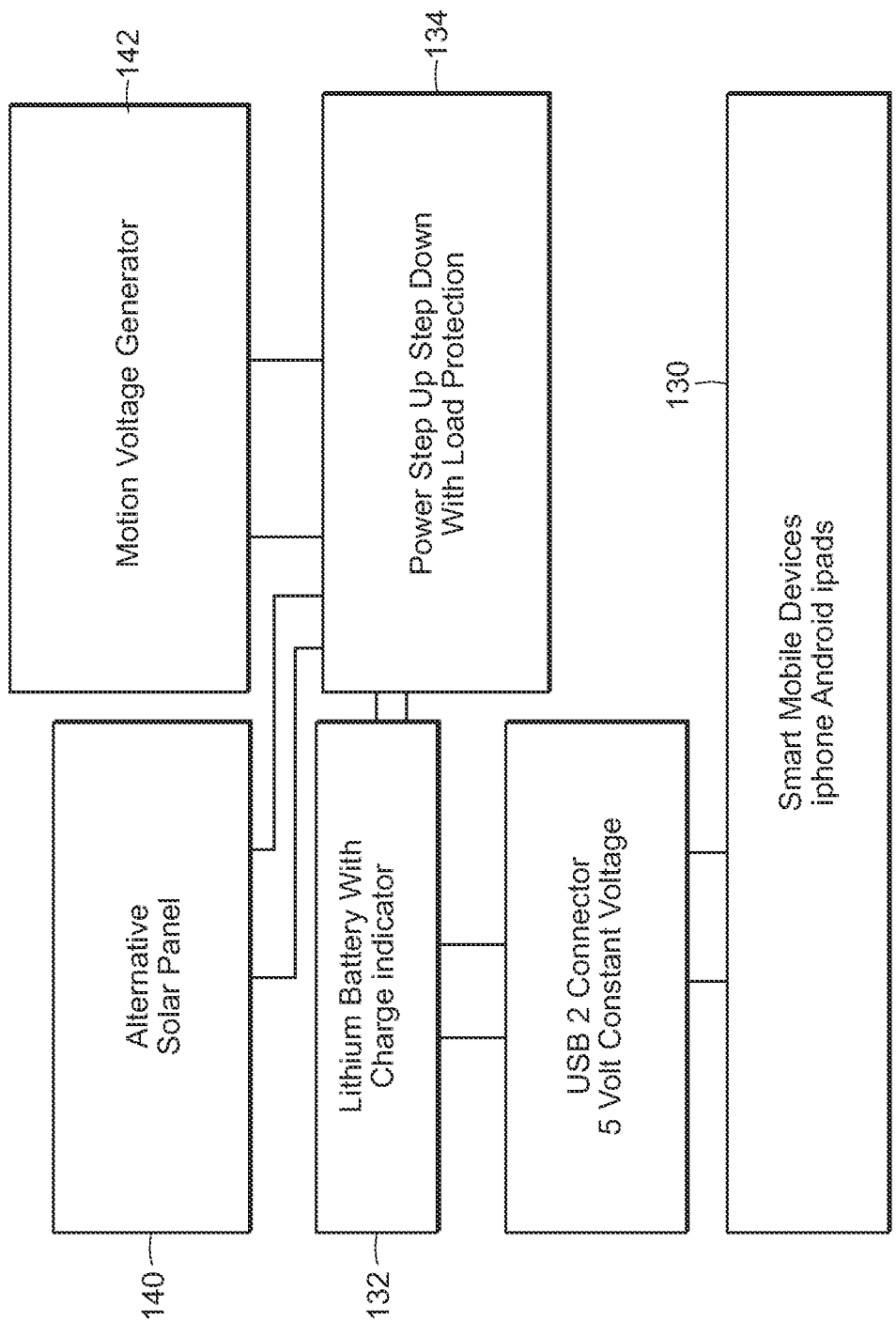
FIG. 13 is a block diagram of an exemplary kinetic energy harvesting device in accordance with one or more embodiments.

FIG. 13 is a functional block diagram of an exemplary power management system for a kinetic energy harvesting device for charging a portable device 130 in accordance with one or more embodiments. The system includes an EM-Power-0007 enhanced USB 5V 1 A 18650 Lithium Battery 132 and a TP4056 Charging Board 134. When voltage is present at the TP4056, it charges the attached lithium battery 132 attached to the b+ and b− terminals. This circuit has an DW01-P IC protecting the lithium battery 132 from overcharging.

Figure 14:
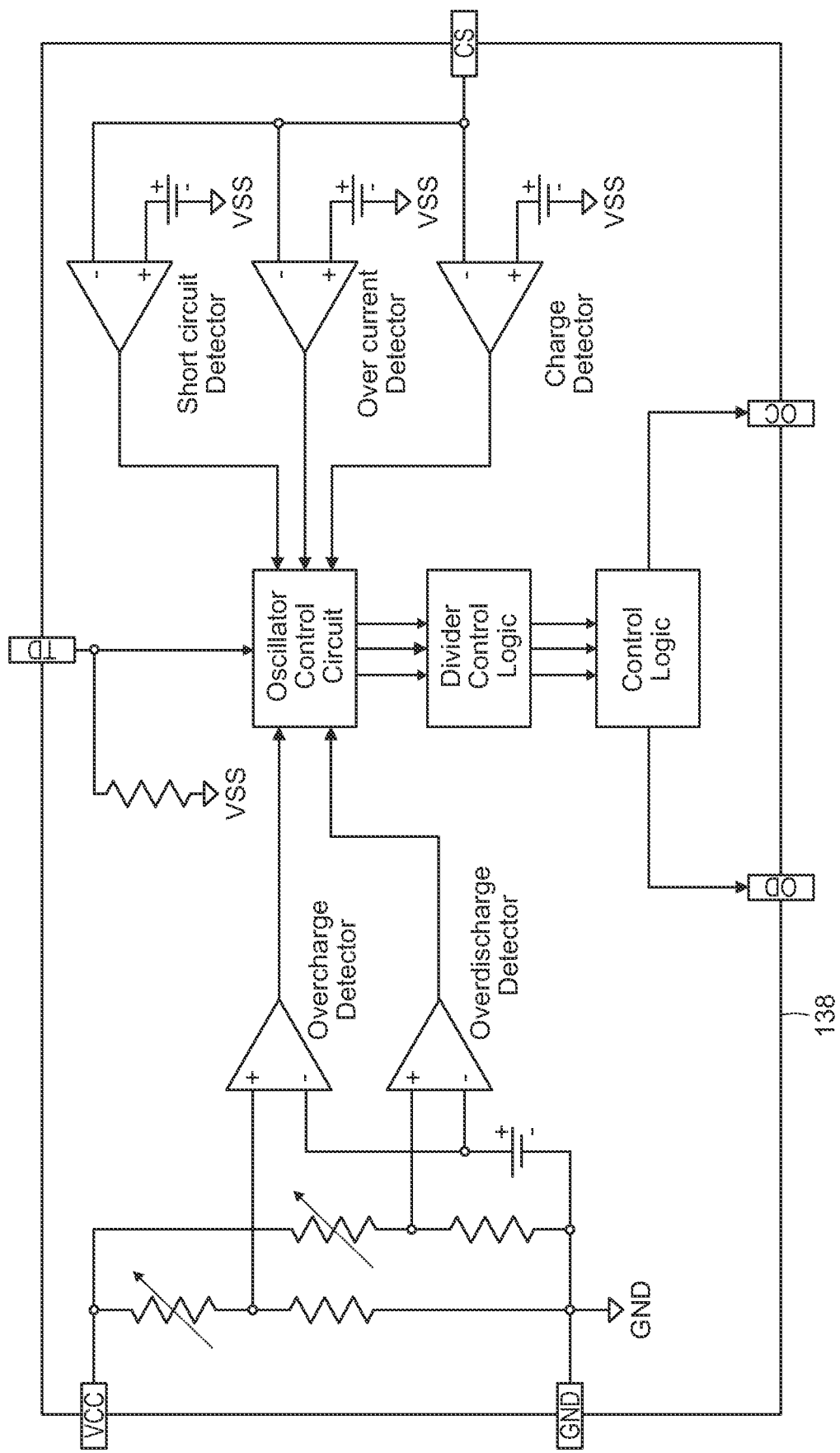
FIG. 14 is a block diagram of a power step up/step down circuit with load protection in accordance with one or more embodiments.

FIG. 14 is a block diagram of the IC 138. The EM-0007 monitors the charge status of the battery 132 and shows the green when the battery is fully charged. A unique feature of this particular design is the power source is generated by renewable energy either solar power through a solar panel 140 or motion generated induction coil from device 142.

Having thus described several illustrative embodiments, it is to be appreciated that various alterations, modifications, and improvements will readily occur to those skilled in the art. Such alterations, modifications, and improvements are intended to form a part of this disclosure and are intended to be within the spirit and scope of this disclosure. While some examples presented herein involve specific combinations of functions or structural elements, it should be understood that those functions and elements may be combined in other ways according to the present disclosure to accomplish the same or different objectives. In particular, acts, elements, and features discussed in connection with one embodiment are not intended to be excluded from similar or other roles in other embodiments. Additionally, elements and components described herein may be further divided into additional components or joined together to form fewer components for performing the same functions.

Accordingly, the foregoing description and attached drawings are by way of example only and are not intended to be limiting.

The invention claimed is:

1. An apparatus for converting kinetic energy to electrical energy, comprising:
   a housing;
   a plurality of magnets fixed at spaced-apart locations in the housing defining multiple paths, wherein at least two of said multiple paths have transverse orientations;
   a plurality of wire coils each movably positioned in the housing for back and forth movement along a different one of said multiple paths such that the movement of the wire coils through magnetic fields of the plurality of magnets generates an alternating current in the wire coils; and
   a circuit electrically connected to each of the wire coils, the circuit including a rectifier to convert the alternating current generated in the wire coils into direct current.

2. The apparatus of claim 1, wherein said housing comprises an airtight vacuum chamber holding at least the wire coil.

3. The apparatus of claim 1, wherein the housing includes a set of rails on which the wire coils travel during back and forth movement along their respective paths.

4. The apparatus of claim 3, further comprising ball bearings on the set of rails to reduce friction between the wire coils and the rails.

5. The apparatus of claim 3, wherein each rail in the set or rails includes a conductive surface electrically connecting the wire coils to the circuit continuously as the wire coils move back and forth along their respective paths.

6. The apparatus of claim 1, further comprising spring elements in the housing at opposite ends of the paths to engage the wire coils and reduce inertia losses as the wire coils change their direction of travel on the paths.

7. The apparatus of claim 1, further comprising pendulum mechanisms attached to the wire coils enabling the wire coils to swing along the respective paths.

8. The apparatus of claim 7, wherein each pendulum mechanism comprises a shaft pivotally mounted in the housing, wherein one end of the shaft is connected to the wire coil and an opposite end of the shaft is connected to a counter weight.

9. The apparatus of claim 7, wherein the plurality of magnets are arranged in pairs in a circular arrangement, and wherein the wire coils swing between pairs of magnets.

10. The apparatus of claim 1, wherein the housing is shaped like a battery and the apparatus is configured to be used in place of a battery to power a device.

11. The apparatus of claim 1, further comprising a battery and a USB charging interface connected to the circuit.

12. The apparatus of claim 1, wherein said plurality of magnets are mounted at spaced-apart locations on a shafts, and wherein each wire coil is arranged concentrically around one of the shafts such that said wire coil can travel back and forth from one end of the shaft to an opposite end of the shaft past the magnets.

13. The apparatus of claim 12, wherein each shaft has a curvilinear shape.

14. A method for converting kinetic energy to electrical energy, comprising the steps of:
   moving each of a plurality of wire coils back and forth along a different one of a plurality of paths defined by a plurality of magnets fixed at spaced-apart locations in a housing such that the movement of each wire coil through magnetic fields of the plurality of magnets generates an alternating current in the wire coil, wherein at least two of said plurality of paths have transverse orientations; and
   converting the alternating current generated in the wire coil into direct current.

15. The method of claim 14, wherein moving each wire coil back and forth along a path comprises swinging the wire coil along a circular path.

16. The method of claim 15, wherein moving each wire coil back and forth along a path comprises moving the wire coil along one or more rails.

17. The method of claim 16, wherein moving each wire coil back and forth along a path comprises moving the wire coil along a cylindrical shaft containing the plurality of magnets.

18. An apparatus for converting kinetic energy to electrical energy, comprising:
   a shaft having a plurality of magnets fixed at spaced-apart locations along the shaft;
   a wire coil element arranged concentrically around the shaft configured to travel back and forth from one end of the shaft to an opposite end of the shaft past the plurality of magnets such that the movement of the wire coil through magnetic fields of the plurality of magnets generates an alternating current in the wire coil element;
   a circuit electrically connected to the wire coil element including a rectifier to convert the alternating current generated in the wire coil element into direct current; and
   a housing enclosing the shaft and wire coil element, said housing including separate first and second conductive collectors electrically connected to the circuit, wherein said wire coil element includes a first conductive element connected to one end of a wire coil in the wire coil element and a second conductive element connected to the other end of the wire coil, and wherein the first and second conductive elements glide along and maintain electrical contact with the first and second conductive collectors, respectively, as the wire coil element travels back and forth from the one end of the shaft to the opposite end of the shaft.

19. The apparatus of claim 18, wherein said shaft has a curvilinear shape.

20. An apparatus for converting kinetic energy to electrical energy, comprising:
   a housing;
   a plurality of magnets fixed at spaced-apart locations in the housing defining a path;
   a wire coil movably positioned in the housing for back and forth movement along the path such that the movement of the wire coil through magnetic fields of the plurality of magnets generates an alternating current in the wire coil;
   a pendulum mechanism attached to the wire coil enabling the wire coil to swing along the path, wherein the pendulum mechanism comprises a shaft pivotally mounted in the housing, wherein one end of the shaft is connected to the wire coil and an opposite end of the shaft is connected to a counter weight; and
   a circuit electrically connected to the wire coil including a rectifier to convert the alternating current generated in the wire coil into direct current.

21. The apparatus of claim 20, wherein said housing comprises an airtight vacuum chamber holding at least the wire coil.

22. The apparatus of claim 20, further comprising spring elements in the housing at opposite ends of the path to engage the wire coil and reduce inertia losses as the wire coil changes its direction of travel on the path.

23. The apparatus of claim 20, wherein the plurality of magnets are arranged in pairs in a circular arrangement, and wherein the wire coil swings between each pair of magnets.

24. The apparatus of claim 20, wherein the housing is shaped like a battery and the apparatus is configured to be used in place of a battery to power a device.

25. The apparatus of claim 20, further comprising a battery and a USB charging interface connected to the circuit.

* * * * *